United States Patent [19]
Huy et al.

[11] Patent Number: 5,806,637
[45] Date of Patent: Sep. 15, 1998

[54] METHOD FOR OPERATING AN ENERGY ACCUMULATOR AND A IMPROVED ENERGY ACCUMULATOR

[75] Inventors: Gerrit Huy; Uwe Ernstberger, both of Stuttgart, Germany

[73] Assignee: Mercedes-Benz AG, Germany

[21] Appl. No.: 759,117

[22] Filed: Dec. 2, 1996

[30] Foreign Application Priority Data

Dec. 1, 1995 [DE] Germany .................. 195 44 844.8

[51] Int. Cl.⁶ .................. G05G 1/00; F16F 15/10
[52] U.S. Cl. .................. 188/290; 74/572; 74/573 F
[58] Field of Search .................. 123/192.2; 74/572, 74/572 F, 572 R; 60/709; 310/74; 303/180; 188/290, 293, 294, 296, 181 A, 182

[56] References Cited

U.S. PATENT DOCUMENTS

| | | | |
|---|---|---|---|
| 4,027,484 | 6/1977 | Wallis | 74/572 |
| 4,036,080 | 7/1977 | Friedericy et al. | 74/572 |
| 4,111,067 | 9/1978 | Hodson | 74/572 |
| 4,208,921 | 6/1980 | Keyes | 74/572 |
| 4,626,696 | 12/1986 | Maucher et al. | 290/38 R |
| 4,928,553 | 5/1990 | Wagner | 475/268 |
| 4,991,247 | 2/1991 | Castwall et al. | 74/573 F |
| 5,007,303 | 4/1991 | Okuzumi | 74/573 F |
| 5,197,010 | 3/1993 | Andersson | 74/573 F |
| 5,466,049 | 11/1995 | Harmsen | 74/573 F |
| 5,692,414 | 12/1997 | Gregoire | 74/572 |

FOREIGN PATENT DOCUMENTS

| | | |
|---|---|---|
| 35 35 394 A1 | 6/1986 | Germany . |
| 4128622 | 4/1992 | Japan .................. 74/573 F |

Primary Examiner—Robert J. Oberleitner
Assistant Examiner—Chris Schwartz
Attorney, Agent, or Firm—Evenson, McKeown, Edwards & Lenahan, P.L.L.C.

[57] ABSTRACT

An energy accumulator has a flywheel journaled in a flywheel housing and is rotationally symmetrical about its axis is driven. The flywheel rotates about its driven axis and when desired is braked. For the defined braking of the flywheel any wobble of the outer periphery of the flywheel relative to the flywheel housing and/or any radial motion of the flywheel relative to the flywheel housing and/or radial stresses/displacements occurring in the bearings are measured as to magnitude and direction and compared with a threshold value. Only when the threshold value is exceeded is the flywheel braked.

8 Claims, 1 Drawing Sheet

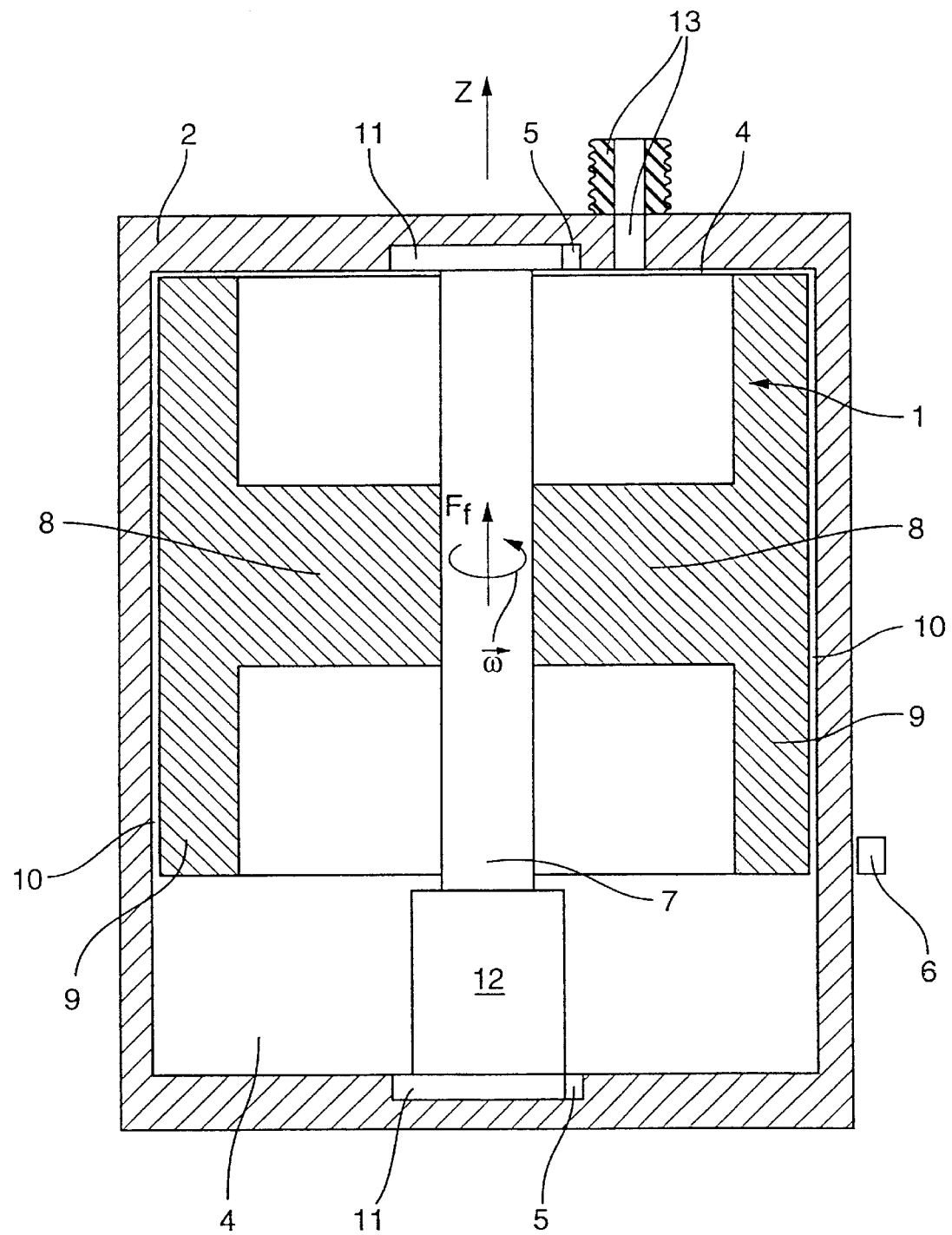

METHOD FOR OPERATING AN ENERGY ACCUMULATOR AND A IMPROVED ENERGY ACCUMULATOR

BACKGROUND AND SUMMARY OF THE INVENTION

The present invention relates generally to a method for operating an energy accumulator having a flywheel journaled in a flywheel housing and rotationally symmetrical about a driven axis and is braked when desired, and to an energy accumulator comprising a flywheel rotatably journaled in a housing and rotationally symmetrical about a driven axis with a brake for braking the flywheel.

An energy accumulator is described in DE 35 35 394 A1 in which a flywheel is rotationally symmetrical about its axis and is contained in a flywheel housing. The speed of rotation of the flywheel is greater than 100 revolutions per second, especially approximately 1000 revolutions per second about its axis which is perpendicular to the plane of the flywheel. The plane of the flywheel is formed by a ring of the flywheel which constitutes substantially the flywheel mass. With a flywheel of this kind, weighing preferably 5 to 10 kg, preferably 8 kg, and a radius of, for example, 20 cm, energy of approximately 1 kilojoule to 160 kilojoules can be stored at the above speed.

Because the rotary speed of the flywheel is very high, however, the flywheel can burst and create a hazard. To prevent this danger, the known flywheel housing was formed such that, in the critical state the flywheel is deflected into a water-bearing material. The internal structure of the flywheel housing is of an abrasive configuration so that a portion of the rotary energy is converted to friction heat. In the water bearing, the flywheel evaporates water, causing the internal pressure of the evacuated housing to increase and the flywheel is additionally retarded, so that the rotational energy is again reduced.

In any case, the flywheel housing can be evacuated to no better than the vapor pressure of water (at T=20° C., PD $H_2O$=25 mbar), so that the friction of the flywheel inside of the flywheel housing is at a minimum level. The friction also results in a power loss. Furthermore, material changes occurring in the water bearing and temperature increases also affect the water vapor pressure. A resulting pressure elevation causes an arbitrary and undefined retardation of the flywheel, for which no change in the flywheel itself is responsible.

The present invention solves the problem of developing a method in which the energy accumulation performance is good and any of the known dangers is forestalled, especially in the event of an accident, and a controlled braking takes place. Furthermore, the present invention has as an object the provision of an energy accumulator which will solve these problems.

The problem of developing a method in which energy accumulation performance is good and any of the known dangers is forestalled and controlled braking takes place has been solved by a method in which (a) measuring wobbling of at least one of an outer periphery of the flywheel relative to the flywheel housing, radial motion of the flywheel relative to the flywheel housing and angular momentum component occurring in bearings, (b) comparing the measured wobble with a threshold value, and, (c) only when the threshold value is exceeded braking the flywheel, and by an energy accumulator having at least one sensor for detecting departure of the axis of the flywheel from a total angular momentum vector, and means for preventing the brake from being actuated to reduce the rotatory speed until a threshold value is exceeded.

The determination according to the present invention of any deviation of the axis of rotation of the flywheel from the axis of the flywheel permits detection of any undesirable or improper movement of the flywheel, such as nutation or precession. Such irregularities can be the result, for example, of an accident, because random torques can be caused thereby. To prevent any possible resulting danger therefrom, the flywheel is braked and stored rotational energy is reduced. Due to the clear correlation that is now possible, the braking procedure is no longer arbitrary in part, but is precisely defined. The measurement of any improper angular momentum component parallel to the plane of the flywheel can be performed, for example, by electrical capacitance and/or inductance through the measurement of the width of the air gap between the flywheel and the flywheel housing, or else by a measurement of stress and/or displacement in the bearings of the shaft, for example by a piezo element or a pressure gauge or a capacitive element, etc.

BRIEF DESCRIPTION OF THE DRAWING

These and other objects, features and advantages of the present invention will become more readily apparent from the following detailed description of currently preferred embodiments when taken in conjunction with the accompanying DRAWING wherein an energy accumulator in accordance with the present invention is schematically shown in axial cross-sectional elevation view.

DETAILED DESCRIPTION OF THE DRAWINGS

The energy accumulator has a flywheel 1 disposed in a flywheel housing 2. The flywheel 1 has, among other things, a cylindrical axle 7 and a hollow cylinder 9 disposed coaxially with the axle and joined to the axle 9 by spokes 8. A small gap 10 is provided between the hollow cylinder 9 and the externally opposite wall of the flywheel housing 2 there is a small gap 10. To increase the moment of inertia of the flywheel 1 as much as possible, the hollow cylinder 9 constitutes most of the mass of the flywheel 1.

The inside chamber 4 of the flywheel housing 2, which is enclosed in an especially vacuum-tight manner, is evacuated to a pressure below $10^{-3}$ mbar, especially to about $10^{-6}$ mbar. The evacuation of the flywheel housing 2 to at least high-vacuum conditions is necessary in order that the flywheel 1 can rotate with the above-mentioned speed and that no excessive, or only negligible, friction losses occur.

To achieve a mounting as friction free as possible, the flywheel 1 has, at both ends of its axle 7, bearings 11 configured as magnetic bearings which in turn are affixed to the flywheel housing 2. An electric motor drive 12 is arranged at one end of the axle 7 of the flywheel 1. The axle 7 is the rotor of the drive 12 so that energy can be fed into or taken off from the flywheel 1. Electrical conductors (not shown) of the electric motor drive are brought out of the housing in a vacuum-tight manner.

Sensors 5 are arranged at the bearings 11 for determining, at least indirectly, the magnitude and direction of stresses and/or displacements. Furthermore, the flywheel housing 2 has another sensor in the flywheel 1 area for detecting the position of the flywheel 1 in the flywheel housing 2. Any departure from the total rotatory impulse of the flywheel 1 from its rotation axis $F_f$ is detected by the sensors 5, 6. Such a departure expresses itself in a wobbling motion of the outer periphery of the flywheel 1 relative to the flywheel housing 2 and/or in a radial motion of the flywheel 1 relative to the flywheel housing 2 and/or by radial stresses or displacements occurring in the bearings 11.

The magnitude and direction of the values detected by the sensors 5, 6 are compared with a threshold value corresponding to an torsional pulse component measured orthogonal to a z-axis of approximately zero. The spatially fixed z-axis is aligned coaxially with the axis $F_f$ of the flywheel 1. If this threshold is exceeded, the brake is activated and the flywheel 1 is braked.

Braking is accomplished by feeding one or more retardant substances through an opening 13 on the flywheel housing 2. Thus braking can not take place until the threshold is exceeded. In order to achieve a rapid filling of the interior 4 of the flywheel housing 2 with the substance or substances, wherein the substances chemically react, and thus obtain rapid braking, it is useful, despite the vacuum prevailing in the flywheel housing 2 and sucking the substance into it, to inject the substance with a working pressure that is above the normal atmospheric pressure. The braking action of the substance is produced by an increase of the friction applied to the flywheel 1 by the substance because then the gap 10 is filled with the substances, resulting in energy-consuming friction losses.

Furthermore, the spokes 8 extending wing-like from the axle 7 are moved through the especially fluid substance, again causing friction losses. In addition to the friction losses, the energy of the flywheel 1 is also reduced by the fact that to move the spokes 8 through the substance requires displacement work which is additionally subtracted from the energy of the flywheel 1.

An additional increase of the braking action can be brought about by bringing the substances within the interior 4 to a chemical reaction, wherein the viscosity of the reaction substance which is formed is greater than the viscosity of the substances prior to the reaction, as is the case, for example, in the synthesis of polyamide 6.6 from adipic acid and 1.6 diaminohexane, as well as from ε-carbolactam and a solvent. Other good combinations of substances among others can also be taken from the various syntheses of polyurethane. In general it will also be advantageous for the spokes 8 to be of a flat shape, because thus they will have a large displacing area, i.e., a comparatively great area for displacing the reaction substance.

The chemical reaction is preferably an endothermal reaction because it simultaneously takes reaction energy from the flywheel 1. An example of such a brake formed of substances is the synthesis of cyclohexane from benzene with the use of hydrogen and a catalyst.

To increase the efficiency of such a brake it is desirable to polymerize the synthesized cyclohexane in a known manner, in which case the viscosity of the polymerizate is greater than that of cyclohexane.

An additional reaction of substances for the purpose of producing the braking action by using the endothermal reaction for energy transformation is the synthesis of liquid cyclopentane from pentane in gas form. Here again, a polymerization of the cyclopentane takes place, especially with the addition of a dehydrogenation catalyst known in itself.

For an another preferred embodiment of the brake, a substance is charged into the interior 4 of the flywheel housing 2 and undergoes a phase change whereby the substance has a greater viscosity after the phase change taking place in the interior 4 than it had before the phase change. Such a substance can be especially an electrorheological fluid, in which case the flywheel housing 2 can be used as a condenser for applying the electrical field required for the phase change. Basically, a similar configuration is possible also using magnetic fluids.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for operating an energy accumulator having a flywheel journaled in a flywheel housing and rotationally symmetrical about a driven axis and is braked when desired, comprising the steps of:

(a) measuring wobbling of at least one of an outer periphery of the flywheel relative to the flywheel housing, radial motion of the flywheel, relative to the flywheel housing and angular momentum component occurring in bearings, (b) comparing the measured wobble with a threshold value, and, (c) braking the flywheel only when the threshold value is exceeded, wherein said braking comprises charging a plurality of substances into the flywheel housing and chemically reacting the substances such that the viscosity of a reaction product is greater than a viscosity of the substances prior to the reacting.

2. The method according to claim 1, wherein the substances react endothermally with consequent energy substraction from the flywheel.

3. The method according to claim 2, wherein said substances comprise benzene and hydrogen.

4. The method according to claim 1, wherein the step of comparing includes selecting the threshold value to correspond to a torsional pulse component of approximately zero measured orthogonally to a z-axis of fixed direction.

5. The method according to claim 1, wherein said substances comprise adipic acid and 1,6 diaminohexane or ε-carbolactam and a solvent.

6. The method according to claim 1, further comprising polymerizing the reaction product.

7. An energy accumulator, comprising:

a flywheel rotatably journaled in a housing and rotationally symmetrical about a driven axis, a brake for braking the flywheel when a threshold value is exceeded, and at least one sensor for detecting departure of the axis of the flywheel from a total angular momentum vector, wherein the brake comprises a plurality of substances which, upon activation, undergo a chemical reaction such that a viscosity of a reaction product is greater that the viscosity of the substances prior to activation.

8. The energy accumulator according to claim 7, wherein the reaction product is polyurethane.

* * * * *